Figures 7, 8:
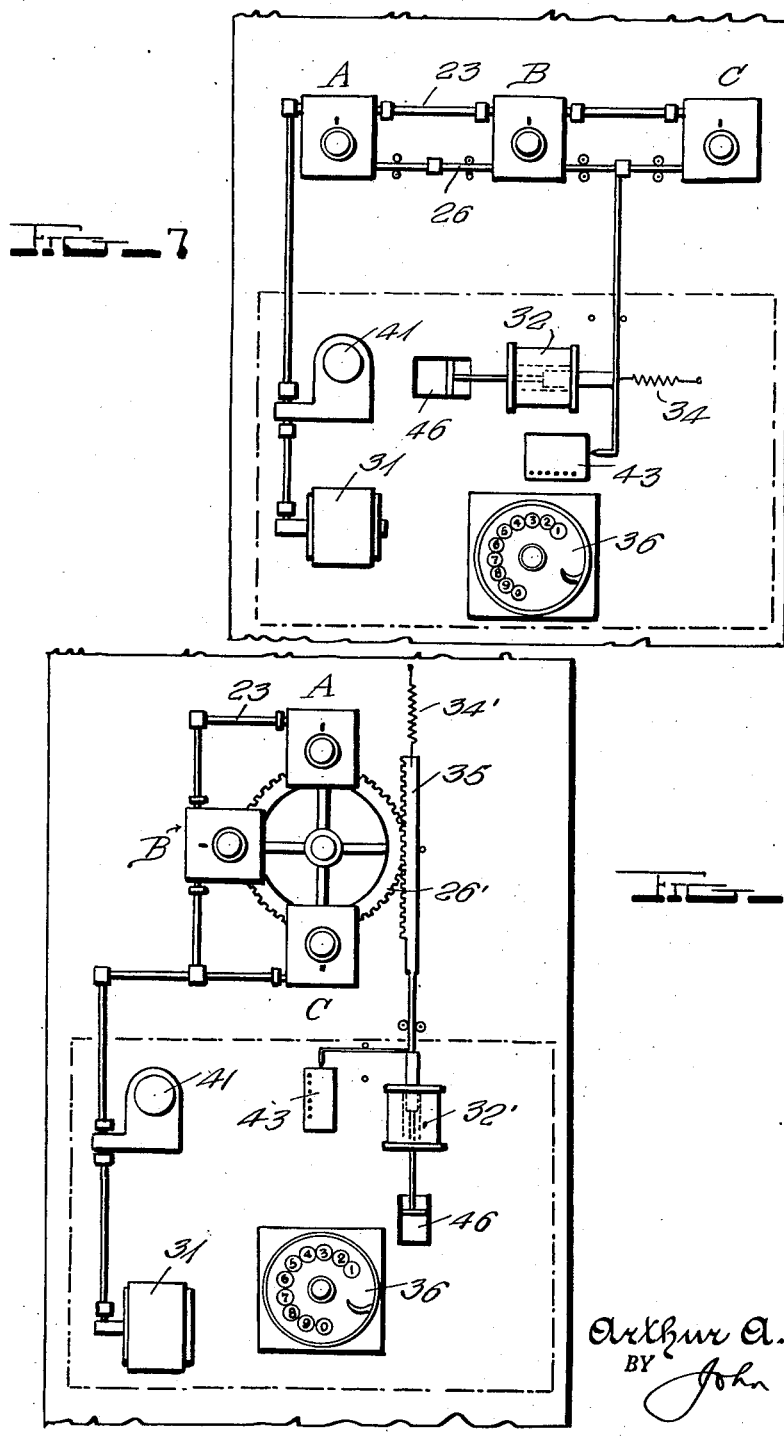

July 11, 1939.  A. A. COLLINS  2,165,226
AUTOMATIC TUNING SYSTEM AND APPARATUS
Filed Aug. 25, 1937  4 Sheets-Sheet 1
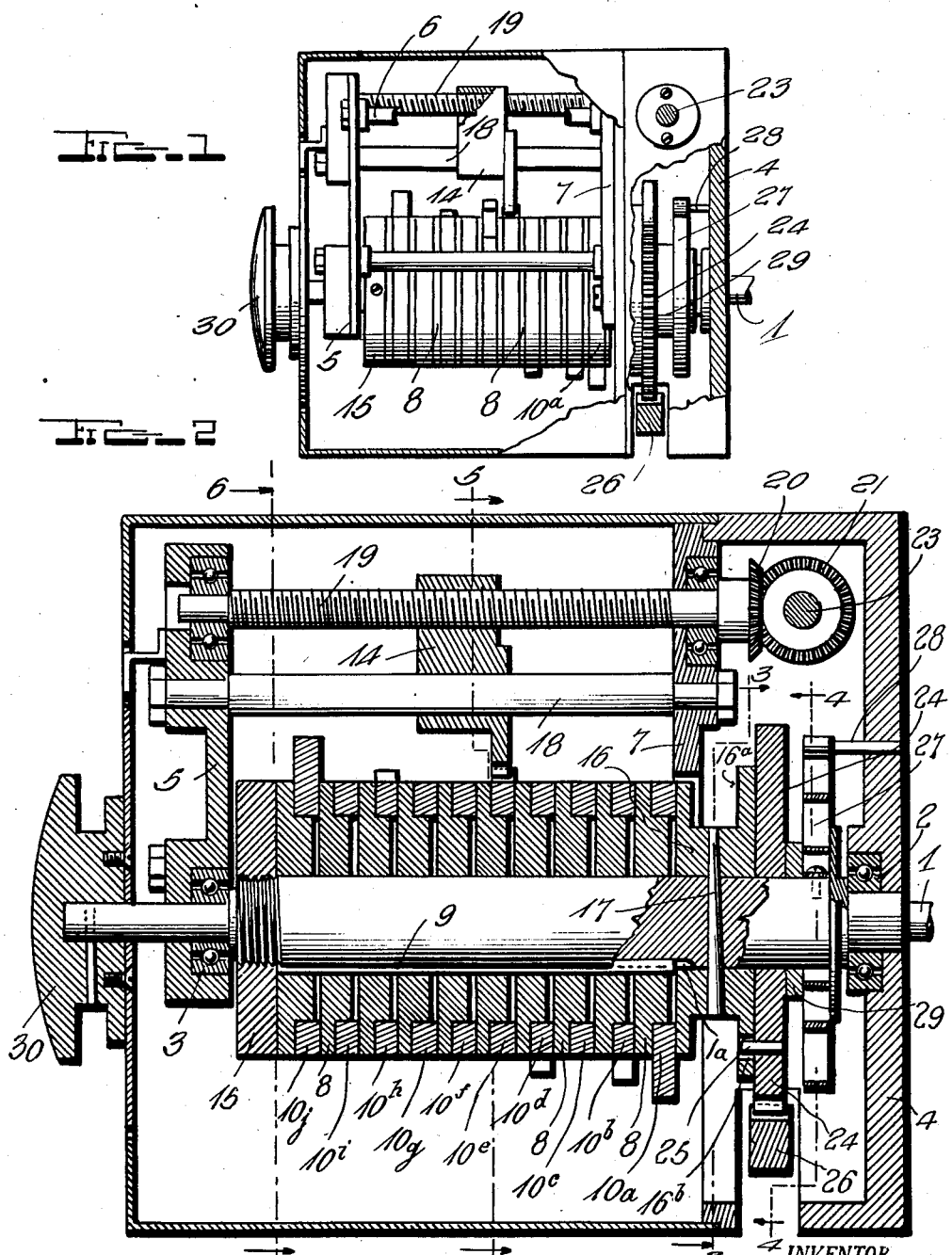
INVENTOR
Arthur A. Collins,
BY John B. Brady
ATTORNEY July 11, 1939.  A. A. COLLINS  2,165,226
AUTOMATIC TUNING SYSTEM AND APPARATUS
Filed Aug. 25, 1937    4 Sheets-Sheet 2
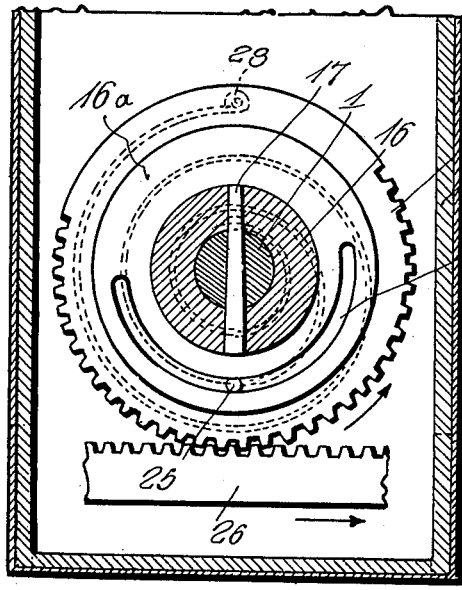
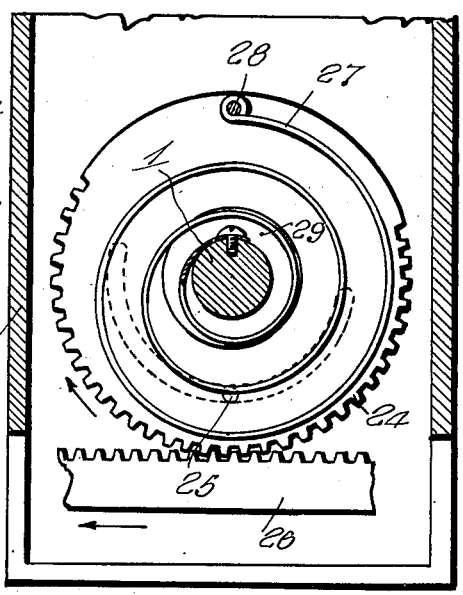
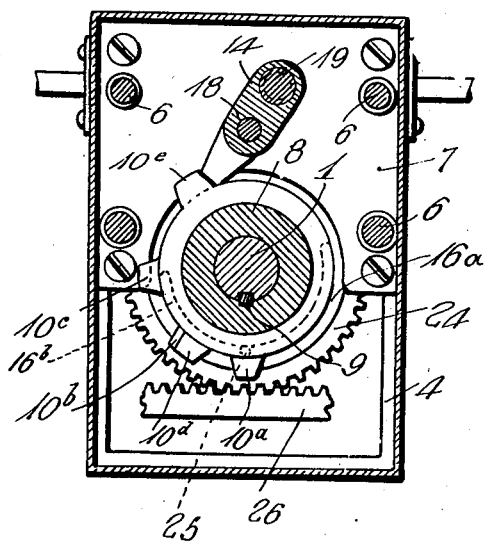
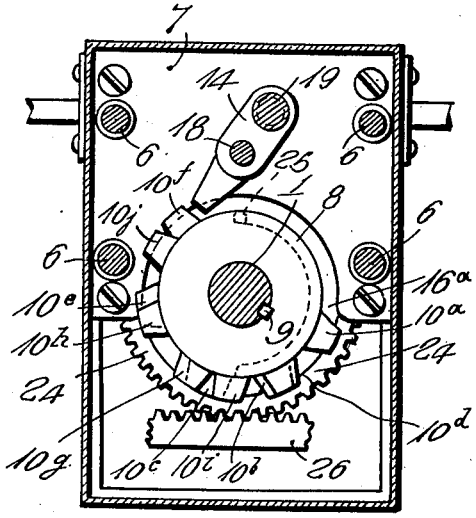
INVENTOR.
Arthur A. Collins,
BY John B. Brady
ATTORNEY.

July 11, 1939.  A. A. COLLINS  2,165,226
AUTOMATIC TUNING SYSTEM AND APPARATUS
Filed Aug. 25, 1937  4 Sheets-Sheet 3

INVENTOR.
Arthur A. Collins,
BY John B. Brady
ATTORNEY.

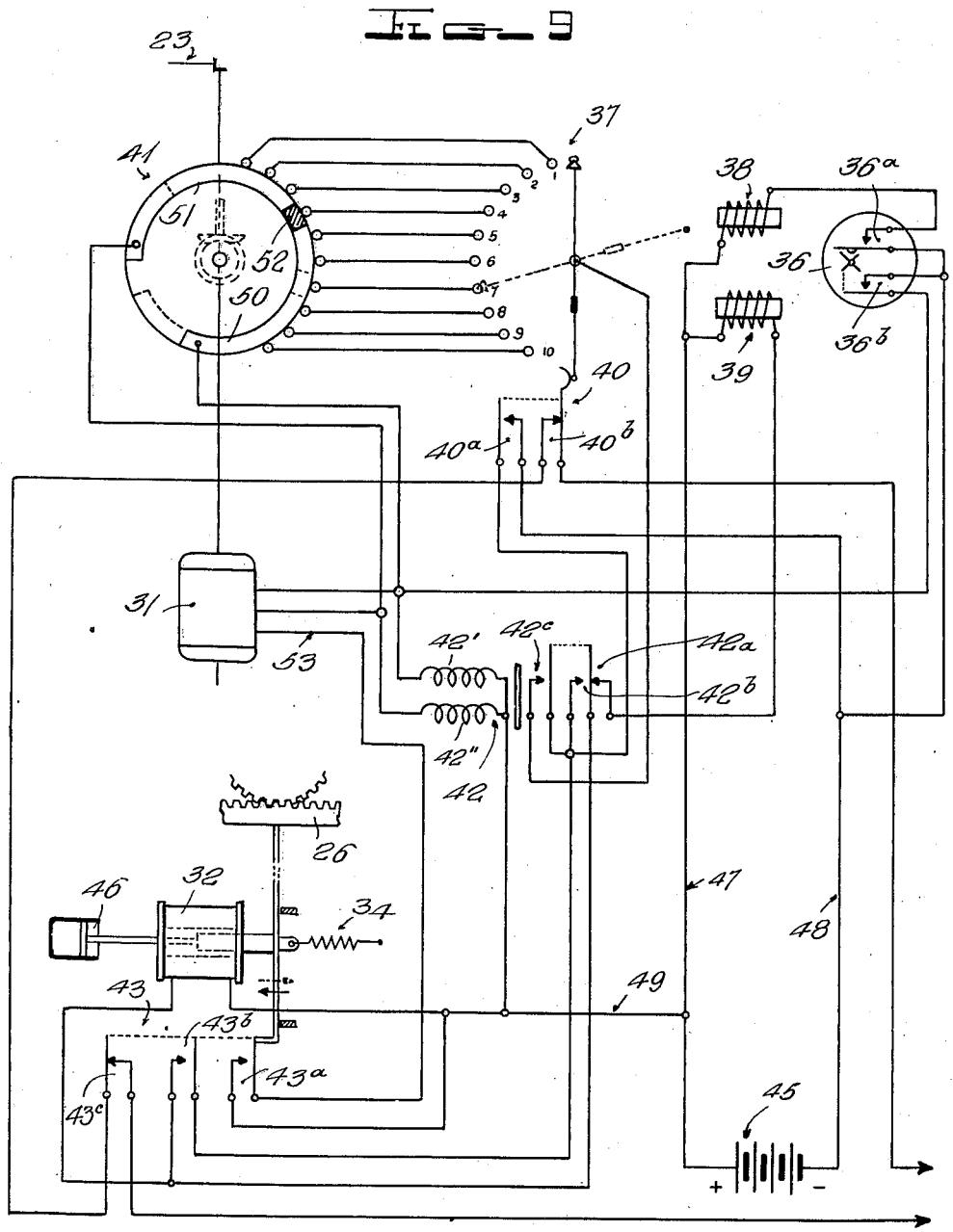

Patented July 11, 1939

2,165,226

UNITED STATES PATENT OFFICE 2,165,226

AUTOMATIC TUNING SYSTEM AND APPARATUS

Arthur A. Collins, Cedar Rapids, Iowa

Application August 25, 1937, Serial No. 160,920

12 Claims. (Cl. 192—142)

My invention relates broadly to radio transmitting and receiving apparatus and more particularly to means for changing the positions of one or a plurality of tuning elements or similar mechanical devices.

This invention constitutes an improvement upon the automatic tuning system and apparatus forming the subject matter of my copending application Serial Number 123,453, filed February 1, 1937.

One of the objects of my invention is to provide mechanically compact and efficient means for actuating variable tuning devices and setting the same tuned to any one of a plurality of predetermined frequencies.

Another object of my invention is to provide means for simultaneously and automatically adjusting the tuning devices in a plurality of circuits, regardless of the relative angular position of the actuating shafts thereof, in corresponding tuned conditions.

Still another object of my invention is to provide means for automatically and simultaneously selecting in a plurality of tuning devices the particular frequency to which the several devices will be automatically set, regardless of the relative angular position of the actuating shafts thereof at the selected frequency.

A further object of my invention is to provide mechanical shaft positioning means having positive drive means operative in common with a plurality of shafts to establish the shafts in a "home" position, and individual drive means for each shaft for establishing the shafts respectively in selected positions.

A still further object of my invention is to provide a control circuit for automatic shaft positioning means which employs a minimum of parts and is simple in structure and operation.

Still another object of my invention is to provide electrical control means for moving shaft positioning means to "home" position and for effecting selection of an operative position for the shaft, whereupon the control means is released and the shaft is moved to the operative position by means individual thereto.

Another object of my invention is to provide a simplified electrical control system for shaft positioning mechanism whereby the shaft is moved to a "home" position and the mechanism is conditioned for establishing the shaft in a selected operative position by a series of impulses from a dial switch, the control system being released when the mechanism is thus conditioned.

Other and further objects of my invention reside in the apparatus and arrangements hereinafter more fully set forth, with reference to the accompanying drawings, in which:

Figure 1 is a side elevation of a shaft positioning mechanism with portions of the casing broken away to show the stop means and the shaft actuating means; Fig. 2 is a vertical longitudinal sectional view of the shaft positioning mechanism on an enlarged scale; Figs. 3, 4 and 5, are vertical cross-sectional views of the apparatus taken on lines 3—3, 4—4 and 5—5 respectively, in Fig. 2; Fig. 6 is a vertical cross-sectional view taken substantially on line 6—6 in Fig. 2, and showing the stop rings and the shaft rotated to "home" position, with a path cleared for movement of the selector stop; Figs. 7 and 8 are front elevational views of different types of panel arrangements of tuning elements with shaft positioning mechanisms mounted thereon and interconnected with electrical control means indicated within the broken lines in Figs. 7 and 8 and shown in detail in Fig. 9, which is a schematic diagram of the circuits of the electrical control means employed in the system of my invention.

The principal object of this invention is the automatic tuning of a radio transmitter or receiver having a plurality of tuning controls, so that it may operate on a number of predetermined frequencies. I will describe the application of my invention specifically to a transmitter, although it is apparent that application to devices other than transmitters can be made. The problem of shifting the operating frequency of a transmitter is a very important one, especially on high frequencies, where the frequencies must be changed from time to time during the day in order to obtain satisfactory communication. It is also desirable to shift the frequency of the transmitter rapidly in order to handle traffic on more than one channel with a single transmitter. Up to the present time, transmitters have been arranged for multi-frequency operation by providing separately tuned circuits for each frequency, and some form of switching means for selecting the desired set of tuned circuits. This system has practical limitations because of the complexity of circuit connections and switching apparatus which must be used in a multi-stage transmitter operating on more than two or three frequencies.

The arrangement of my invention overcomes the practical difficulties inherent in previous systems, and, in addition, is compact and flexible in adjustment. This arrangement consists essentially of a system of mechanical positioning mechanisms applied to the rotating shafts of the adjustable tuning units of the transmitters, and interconnected in such a way with suitable actuating means that a group of dialed energy impulses will act to position each of the tuning shafts to the desired angular position corresponding to the correct adjustment for each frequency. The angular position of each tuning shaft may be independently predetermined for ten or more independent tuning adjustments, and a like number of different frequencies may thus be selected by corresponding groups of dialed impulses.

My invention is directed especially to a structure of shaft positioning mechanism which employs a positive drive from motive means to establish the shaft in a "home" or start position, and subsequently allows spring means to act on an individual shaft to rotate the shaft to a desired operating position, and to maintain the shaft in such position against a selector stop. The shaft actuating means are so constructed that a plurality of shafts may be connected with a common motive means and rotated through different angular distances in the operation of the system of my invention. The electrical control means for actuating the shaft operates in a predetermined timed sequence, and includes means for moving a selector stop to any one of a plurality of positions for cooperation with a selected pre-set stop ring carried by the shaft.

Referring to the drawings in more detail, reference character 1 indicates the rotatable shaft which may be directly connected with the shaft of a variable tuning element such as a variable condenser, not shown. As illustrated more particularly in Fig. 2, the shaft 1 is journaled in bearings 2, 3, mounted in the base structure 4 and bracket 5. The bracket 5 is supported by bolts 6, from the sector plate 7 carried by the base structure 4. The shaft 1 carries a series of spacer rings 8 which are slidable but non-rotatable with respect to the shaft because engaged by a key 9 which lies in a keyway 1a in shaft 1. The spacer rings 8 have shoulders formed in their outer edges which support the series of stop rings 10a ... 10j, so that each stop ring may be individually rotated with respect to adjacent non-rotatable spacer rings 8 without affecting the adjustments of others of the stop rings. The rings in the series 10a ... 10j, coact individually with a movable selector stop 14.

The stop rings and spacer rings are clamped on the shaft 1 between a nut 15 and a collar 16 which may be integral with the shaft 1 or rigidly pinned thereto as by tapered pin 17. The movable selector stop 14 is slidably mounted on a guide rod 18 and screw-threaded to engage a lead screw 19, which is mounted in bearings in the bracket 5 and plate 7, and has a bevel gear 20 mounted thereon in engagement with a driving gear 21 connected with a drive shaft 23 passing through bearings in the base 4. Suitable movement of shaft 23 therefore will position the selector stop 14 opposite any one of the stop rings 10a ... 10j, for coaction therewith to determine the angular position of the shaft 1.

In order that the movable selector stop 14 may be shifted from one position to another, the shaft 1 is moved to a "home" position' as shown in Fig. 6, with the stop rings displaced to provide a clear path for the movable stop 14. The mechanism for shifting the shaft 1 includes a flange 16a on the collar 16, which has an arcuate slot 16b therein extending substantially 180° or slightly greater, as illustrated particularly in Fig. 3. Adjacent the flange 16a is a gear 24 rotatably mounted on the shaft 1 and carrying a pin 25 engaged in the slot 16b. Gear 24 is adapted to be driven by a rack 26 mounted in operative position in engagement with the gear 24, the rack 26 being moved in each operation a sufficient distance to rotate the gear 24 through substantially 180°. The operation of the shifting mechanism therefore is as follows. Considering the set position of the shaft 1 as shown in Fig. 3, gear 24 is rotated in a counterclockwise direction, the pin 25 eventually engages the end of slot 16b and rotates the collar 16 and shaft 1 with the gear 24 to the limit of movement thereof, as indicated in Fig. 6. With the shaft in this position the selector stop is moved to the desired location, and gear 24 is driven in reverse or clockwise direction to the limit of its movement, with pin 25 free to move in slot 16b.

The shaft 1 has individual means for moving it in clockwise rotation, comprising a spiral spring element 27, shown particularly in Fig. 4, which is fixed to the shaft 1 and a pin 28 mounted on the base 4, as shown in Figs. 1 and 2. A washer 29 is provided between the gear 24 and spring 27. With the shaft 1 in "home" position the spring 27 is tensioned so that as the gear 24 is rotated clockwise the shaft follows under the action of spring 27 until the selector stop 14 is engaged by one of the stop rings, as indicated in Fig. 5. The gear 24 in the meantime continues to rotate to its full limit of movement, with pin 25 moving in slot 16b. Spring 27 has sufficient tension at all times to maintain the shaft positively in selected position with the coacting stop ring in forced abutment with the selector stop 14.

Manual control knob 30, with dial and indicator, is provided to facilitate adjustment of the stop rings in the automatic control mechanism in the arrangement thereof providing for selection of a desired position for shaft 1.

The shaft positioning mechanism of my invention is especially adapted for operation in conjunction with others of the same type, as shown in Fig. 7. Drive shafts 23 of the units A, B, C, are coupled together and driven through suitable gearing by motor 31. Racks 26 are joined together by suitable coupling and actuated by a solenoid device 32 and spring 34. Suitable electrical sequence control means are provided for operating motor 31 and solenoid 32, as shown in Fig. 9.

Fig. 8 shows a modified arrangement for conjoint operation of a number of units A, B, C. In the form shown in Fig. 8, the racks are combined in a single gear 26' which is mounted on the panel structure. The solenoid 32' and spring 34' actuate a rack 35, or any other suitable means, for rotating the gear 26' as required.

Referring now to Fig. 9 the control system includes an impulse dial switch 36, having impulse contacts 36a and off-normal contacts 36b; a minor switch 37 having actuating coil 38, release coil 39, and off-normal contacts at 40; a drum switch 41; a double wound timing relay 42; and contacts at 43 actuated by the solenoid 32. A source of power is provided at 45. Dash-pot or other suitable damping means frictional or hydraulic, is provided at 46 in connection with the solenoid actuated mechanism to avoid mechanical shock in the operation of the system.

Actuating coil 38 of the minor switch 37 is connected with one side of the source 45 through lead 47, and the circuit is completed through the impulse contacts 36a of dial switch 36 back to the other side of the source through lead 48. The release coil 39 is connected through lead 47 to one side of the source 45, and the circuit is completed through relay contacts 42a, solenoid switch contacts 43b, off-normal minor switch contacts 40a, and lead 48 back to the source.

The relay 42 has dual actuating windings 42' and 42'', either of which serves to actuate the contacts 42a, b and c. In addition the relay is a timing device operating with a slow release characteristic for properly controlling the circuits and the operation of the system. Windings 42' and 42'' are connected directly to the source 45 through lead 49. The circuit to winding 42' is completed through off-normal contacts 36b of the dial switch 36 in the initial operation of the system. Windings 42' and 42'' are selectively connected through the drum switch 41 and minor switch 37, relay contacts 42c, off-normal minor switch contacts 40a and and lead 48 back to the source 45. The drum switch 41 has two segmental contacts 50 and 51 connected respectively to windings 42' and 42'', either segmental contact being connected in circuit depending upon the position of minor switch 37. An insulating segment 52 in drum switch 41 serves to disconnect both windings 42' and 42'' when the drum switch, and associated drive shaft system 23, are in corresponding position. As shown in Figs. 7 and 8, and indicated in Fig. 9, drum switch 41 is driven from motor 31 by suitable gearing, and serves to establish the selector stop 14 in corresponding selected position for stopping the shaft 1 in desired position.

The motor 31 is reversible, and has the neutral lead 53 therefrom connected to one side of the source 45 through solenoid switch contacts 43a and lead 49. The forward and reverse leads are selectively connected back to the source 45 through the circuits above described for windings 42' and 42'' of relay 42, the relay being operative during either forward or reverse operation of the motor 31. Relay 42 is maintained operative for a predetermined interval following cut-off of the source 45 in drum switch 41, by reason of the slow release characteristic of the relay.

Solenoid 36 is connected directly to one side of the source 45 through lead 49, and the circuit is completed thereto through relay switch contacts 42b, off-normal minor switch contacts 40a and lead 48 back to the source 45. A shunt circuit for relay contacts 42b is provided through the solenoid switch contacts 43b so that the solenoid once operated is maintained operative until release of the minor switch 37 which opens off-normal contacts 40a.

Solenoid switch contacts 43c and off-normal minor switch contacts 40b are connected in series with the transmitter standby circuit to remove plate power from the transmitter during frequency changes with the apparatus of my invention.

*Operation*

The sequence of operation of the automatic control system of my invention is as follows, beginning with the transmitter in an operating condition on the frequency corresponding to, say #4 and it is desired to operate on the frequency corresponding to #7.

The operator inserts his finger in #7 on the dial switch 36 and pulls it around against the stop. This closes off-normal contacts 36b, completing a circuit through source 45 and the winding 42' of relay 42, causing it to operate. Operation of relay 42 breaks circuit to release coil 39 at contacts 42a for the duration of the time that relay 42 is energized.

Release of the operator's finger allows the dial switch 36 to return to normal position producing seven current impulses which flow through actuating coil 38 and cause the contact arm of minor switch 37 to come up to the seventh position, as shown dotted in Fig. 9. Contacts 40a close as soon as the contact arm moves from the off position, and the contacts 40b open. Return of dial switch 36 to the normal position breaks the circuit to winding 42' of relay 42; however, the release time of relay 42 is sufficient to keep the relay momentarily operated.

Closing of contacts 40a completes two circuits: firstly, one through relay contacts 42b and solenoid 32, operating the solenoid and causing rack 26 to move the shaft 1 to "home" position; and secondly, a circuit through relay contacts 42c, minor switch 37 (seventh contact), segment 50 of drum switch 41, and including winding 42' of timing relay 42, holding the relay in operation.

When solenoid 32 is energized, solenoid switch contacts 43b close, bridging contacts 42b and holding solenoid 32 energized until release of minor switch 37.

When solenoid 32 is energized, solenoid switch contacts 43a are closed, completing a circuit through motor 31, segment 50 of drum switch 41, the seventh contact of drum switch 41 and minor switch 37, and contacts 42c and 40a, to drive motor 31 in a forward direction until insulating contact 52 comes opposite the seventh contact of drum switch 41, breaking the motor circuit and the circuit to relay winding 42'. Should the inertia of motor 31 and drum switch 41 carry insulating segment 52 beyond the seventh contact, the circuit is remade through contact segment 51 and the motor 31 is driven in reverse direction; simultaneously the relay winding 42'' is energized. The slow release of relay 42 prevents opening of the relay contacts immediately upon the disconnection of winding 42', or winding 42'', so that this reversal operation may be effected.

Motor 31 comes to rest, and after a predetermined time interval the relay contacts are released. Current is applied to release coil 39 through contacts 42a, 43b and 40a, returning switch 37 to "home" position. Contacts 40a open, removing power from solenoid 32, which has been kept on through contacts 43b, and allowing rack 26 to return to its normal position under the action of spring 34. Contacts 42c are provided especially to remove power from the minor switch and drum switch circuit while minor switch arm is moving towards off position, to prevent further operation of the motor 31 and relay 42.

The full cycle of operation of the automatic positioning system may be described less specifically as follows: An impulse transmitter of the type commonly used in dial telephone circuits is operated to send a series of impulses to a selector switch and simultaneously to actuate a slow release relay device. The relay operates to apply power to solenoid means for moving all shafts to "home" positions. Switch means operated by the solenoid applies power to a motor which functions under the control of the selector switch to establish the selector stop in desired position. The relay is kept operative with the motor, and releases after a predetermined interval following disconnection of the motor and the relay. Release of the relay energizes release means for the selector switch, and power is removed from the system.

It is to be understood that modifications may be made in the apparatus without departing from the plan of my invention. The device disclosed is particularly adaptable for use in small radio transmitters, such as for aircraft, where there are usually but three or four tuning elements which may be arranged in a row for simplest conjoint actuation. The use of solenoid and spring means in conjunction to control the angular movement of the shafts in opposite directions of rotation permits simplification of the control system to a marked degree. In consequence, the system of my invention employs a minimum of parts and is reliable and stable in operation. Thus while I have disclosed my invention in certain preferred forms, I intend no limitations thereon, except as may be imposed by the scope of the appended claims.

What I claim as new and desire to secure by Letters Patent of the United States is as follows:

1. A mechanical shaft positioning system including a series of stop rings disposed axially on a shaft, a movable stop selectively adjusted for engagement with one of the stop rings, spring means connected with the shaft for urging said one of the stop rings in contact with said stop, and positive drive means for moving said shaft with said stop rings to a "home" position.

2. A mechanical shaft positioning system including a series of stop rings disposed axially on a shaft, a movable stop selectively adjusted for engagement with one of the stop rings, spring means for urging said one of the stop rings in contact with said stop, and pin and groove drive means operable to move said shaft in opposition to said spring means to a predetermined "home" position, the groove feature of the last said means being adapted to permit said shaft to stop in a plurality of positions as determined by said stop rings.

3. In a mechanical shaft positioning system including a series of stop rings disposed axially on a shaft, a movable stop selectively adjusted for engagement with one of the stop rings, a flanged collar member mounted in fixed relation on said shaft, a gear rotatively mounted on said shaft adjacent said collar member, pin and arcuate groove connection means between said gear and said flanged collar member, and means for rotating said gear through an angular movement substantially equal to said arcuate groove.

4. In a mechanical shaft positioning system including a series of stop rings disposed axially on a shaft, a movable stop selectively adjusted for engagement with one of the stop rings, a spiral spring member mounted on said shaft and operative to urge the said one of the stop rings in contact with said stop, and positive drive means for moving said shaft with said stop rings to a "home" position and for tensioning said spring member for opperation to the opposite limit of movement of said shaft.

5. In a shaft positioning system, an assembly comprising a series of stop rings disposed axially on a shaft, a movable stop adapted for coaction with a selected one of said stop rings, solenoid actuated means for rotating said assembly to a "home" position, motor means for setting said stop in alignment with the selected stop ring, and spring means for rotating said assembly to bring the selected stop ring into contact with the stop, said solenoid actuated means being so constructed and arranged as to permit various stopped positions of said assembly.

6. In a shaft positioning system, an assembly comprising a series of stop rings disposed axially on a shaft, a movable stop adapted for coaction with a selected one of said stop rings, solenoid actuated means for rotating said assembly to a "home" position, motor means for setting said stop in alignment with the selected stop ring, spring means for rotating said assembly to bring the selected stop ring into contact with the stop, said solenoid actuated means being so constructed and arranged as to permit various stopped positions of said assembly, and automatic electrical control means connected with said solenoid actuated means and said motor means and operable in a predetermined sequence for effecting establishment of the shaft in desired position.

7. In a shaft positioning system as set forth in claim 6, an impulse dial switch, and means for employing a series of electric current impulses to actuate said automatic electrical control means.

8. In a shaft positioning system, a plurality of stop means adjustably mounted on a shaft, a movable stop adapted for coaction with a selected one of said stop means, means for separately rotating said shaft and moving said stop, and an automatic electrical control system including a time delay slow release relay device for directly controlling the operation of the last said means in a predetermined sequence of operations to establish the shaft in desired position.

9. In a shaft positioning system, a plurality of stop means adjustably mounted on a shaft, a movable stop adapted for coaction with a selected one of said stop means, means for separately rotating said shaft and moving said stop, and an automatic electrical control system including a time delay slow release relay device for directly controlling the operation of the last said means, and switch means actuated by the shaft rotating means for conditioning the stop moving means and being cooperative with said relay device for operating said shaft and said stop in a predetermined sequence of operations to establish the shaft in desired position.

10. A shaft positioning system comprising adjusted stop means for the shaft, a movable coacting stop, solenoid means for moving the shaft and motor means for moving said stop, and automatic electrical control means for said solenoid and said motor means, including a source of power, a slow release relay having a plurality of sets of contacts, an impulse dial switch in combination with off-normal contacts and a minor selector switch, a drum switch driven by said motor means, switch elements actuated by said solenoid means, and circuit connections from said source to said relay through said off-normal contacts, connections from said source to said solenoid means through contacts of said relay, connections from said source to said motor means through other contacts of said relay and said switch elements actuated by said solenoid means, the last said connections including said selector switch and said drum switch for controlling the selective operation of said motor means, and power cut-off means connected with said source through other contacts of said relay and actuated upon the release of said relay after a predetermined period of operation thereof for removing power from said automatic control means, including said cut-off means.

11. In a shaft positioning system, automatic electrical control means as described in claim 10 and including additional switch elements actuated by said solenoid means and connected in shunt with the contacts of said relay in circuit with said solenoid means, whereby said solenoid means is maintained operative until the operation of said release means removes power from the automatic control means.

12. In a shaft positioning system, automatic electrical control means as described in claim 10, and wherein said motor means is provided with separate connections for forward and reverse operation, and said relay is provided with dual actuating windings connected for operation separately with the forward and reverse connections in said motor means.

ARTHUR A. COLLINS.